(12) United States Patent
Kilfeather et al.

(10) Patent No.: US 6,243,648 B1
(45) Date of Patent: Jun. 5, 2001

(54) FAST ACQUISITION POSITION REPORTING SYSTEM

(75) Inventors: James B. Kilfeather, Purcellville; Mark C. Sullivan, Annandale, both of VA (US)

(73) Assignee: Eagle Eye, Inc., Herndon, VA (US)

( * ) Notice: Subject to any disclaimer, the term of this patent is extended or adjusted under 35 U.S.C. 154(b) by 0 days.

(21) Appl. No.: 09/351,852

(22) Filed: Jul. 12, 1999

(51) Int. Cl.$^7$ .............................. G01S 5/02; G04S 5/10
(52) U.S. Cl. ................. 701/213; 701/207; 701/215; 342/357; 379/59
(58) Field of Search ................. 701/213, 207, 701/215; 342/357; 379/59

(56) References Cited

U.S. PATENT DOCUMENTS

| | | | |
|---|---|---|---|
| 4,740,792 | * 4/1988 | Sagey et al. | 342/357 |
| 4,751,512 | * 6/1988 | Longaker | 342/357 |
| 5,043,736 | * 8/1991 | Darnell et al. | 342/357 |
| 5,202,829 | * 4/1993 | Geier | 364/449 |
| 5,223,844 | * 6/1993 | Mansell et al. | 342/357 |
| 5,225,842 | 7/1993 | Brown et al. | 342/357 |
| 5,379,224 | 1/1995 | Brown et al. | 701/207 |
| 5,444,450 | * 8/1995 | Olds et al. | 342/357 |
| 5,448,623 | * 9/1995 | Wiedeman et al. | 379/59 |
| 5,554,993 | * 9/1996 | Brickell | 342/357 |
| 5,587,715 | * 12/1996 | Lewis | 342/357 |
| 5,629,707 | * 5/1997 | Heuvel et al. | 342/357 |
| 5,758,261 | * 5/1998 | Wiedeman | 455/13.1 |
| 5,768,266 | * 6/1998 | Thompson et al. | 370/321 |
| 5,841,398 | * 11/1998 | Brock | 342/357 |
| 5,884,142 | * 3/1999 | Wiedeman et al. | 455/12.1 |
| 5,955,986 | * 9/1999 | Sullivan | 342/357.05 |
| 5,969,669 | * 10/1999 | Ishikawa et al. | 342/357.02 |
| 5,969,673 | * 10/1999 | Bickley et al. | 342/357.09 |
| 6,112,054 | * 8/2000 | Kita | 455/12.1 |

* cited by examiner

Primary Examiner—William A. Cuchlinski, Jr.
Assistant Examiner—Tuan To
(74) Attorney, Agent, or Firm—Shaw Pittman

(57) ABSTRACT

A geographic tracking system with minimal power and size required at the mobile terminal collects observation data at the mobile terminal, forwards the data to a processor, which calculates the position. The mobile terminal needs only to gather a few milliseconds of observation data, and to relay this observation data to the processor. The range from the satellite (or other airborne transponder) to the terminal is determined using the known positions of an interrogating transmitter and a satellite, and a known terminal delay between the received signal and the transmission of the return signal, and the round trip time. An arc of locations is determined by computing an intersection of a sphere centered at the satellite having a radius given by the calculated range with a model of the Earth's surface. Only that portion of the arc within the region bounded by the satellite beam pattern is retained. Next, the time when the mobile terminal collected the GPS signal is determined. A satellite orbit model estimates the positions of the GPS satellites at their time of transmission. Using discrete points on the arc as an initial guess, an iterative least squares technique fits the observation data to the predicted data and minimizes residual error. After convergence, this estimated position solution is then screened against the known satellite range, satellite beam boundaries, an acceptable altitude range, and a maximum residual threshold. Those position estimates not meeting these criteria are discarded. The remaining points are then subjected to a final improved position estimate and residual calculation and the best point is selected.

35 Claims, 6 Drawing Sheets

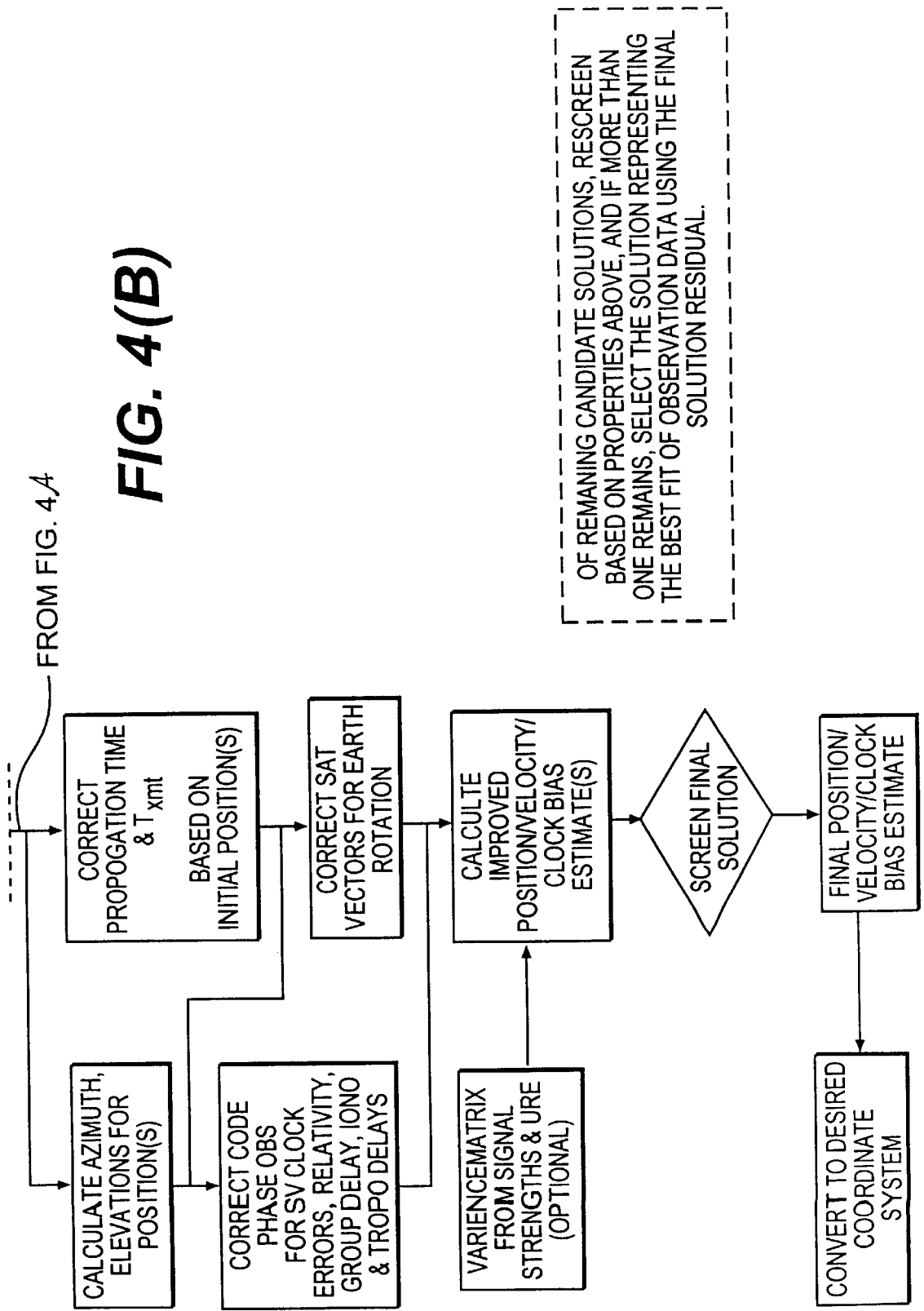

FAST ACQUISITION POSITION REPORTING SYSTEM

BACKGROUND OF THE INVENTION

The present invention relates generally to methods and systems for tracking the location of devices near the surface of the Earth, and more particularly to a method and system for tracking a device near the surface of the Earth using a very fast acquisition portable transponder.

Various techniques are available to determine the position of a device on the surface of the Earth. U.S. Pat. No. 3,063,048 discloses the use of the Doppler shift in a transmitted signal to determine the position of a device transmitting the signal. This patent teaches measuring when the Doppler shift frequency was changing at a maximum rate to determine the position of the object transmitting the signal undergoing the Doppler frequency shift. In this system, the satellite must continuously receive the signal being transmitted from the object to determine when the frequency is changing at its maximum to locate the object. As a result, the time to compute a position fix is unacceptably long for applications such as locating a satellite telephone.

The Global Positioning System (GPS) also provides geo-location capability. Moreover, it is desirable know the position of a remote terminal, such as a cellular telephone, and to have this position information at a central location (e.g., at a Service Operations Center or SOC).

One technique is to place a GPS receiver on the remote terminal, calculate position in the GPS receiver, and transmit via satellite (or other communications system) the position fix to a central location. This method suffers from the Time-To-First-Fix (TTFF) limit inherent in GPS receivers upon waking up from a cold start. From the cold start state, a GPS receiver must download the GPS satellite almanac, ephemeris, and clock correction information. The TTFF limit effectively eliminates using a GPS receiver in situations where a long TTFF is unacceptable, such as in processing a telephone call from a wireless or cellular telephone.

The present invention is therefore directed to the problem of developing a system and method for calculating the position of a mobile terminal, which can be accomplished rapidly using a minimal amount of power and equipment.

SUMMARY OF THE INVENTION

The present invention solves this problem by collecting observation data at the mobile terminal, forwarding the observation data to a central location, and performing the position calculations at the central location rather than at the individual mobile terminal. Thus, the mobile terminal of the present invention needs only to gather a few milliseconds of observation data, such as GPS code phase information, and then relay this observation data to a central station, via satellite, for subsequent position calculation. In this manner, the present invention requires that the mobile unit be on only for very brief periods of time, so that a very fast (e.g. 1 second including data transmission time) position solution can be obtained. This would make practical, for example, the geolocation of a phone prior to a call being placed, which is particularly useful in satellite based phone services to control access and call routing decisions. The fast solution and minimal battery drain make practical the employment of a geolocating system in situations that may not otherwise economically justify such use.

According to one aspect of the present invention, a system for determining the location of an object located on or near the surface includes a communication satellite, a satellite gateway or earth station, a remote terminal, and an operations center. In this system, the communications satellite broadcasts an interrogation signal, to which the remote terminal responds. The remote terminal is disposed on the object, and includes a receiver, a transmitter and a processor. The receiver receives the interrogation signal from the communications satellite, and is capable of receiving signals being broadcast from GPS satellites. The processor measures at least one characteristic in each of the signals being broadcast from the GPS satellites upon receipt of the interrogation signal from the communications satellite. The remote terminal transmits a reply signal at a predetermined time relative to receipt of the interrogation signal to the communications satellite. The reply signal includes the measured characteristic(s) in each of the signals being broadcast from the plurality of GPS satellites. The operations center receives the reply signal from the communications satellite, and calculates a position of the remote terminal using time of arrival information and the measured characteristics returned by the remote terminal.

In the above system, the measured characteristic(s) can include, for example, code phase information, carrier phase information, Doppler-shift information, bit phase information, or Fourier transform coefficients.

The service operations center includes a processor calculating a range between the communications satellite and the remote terminal. In this calculation, the processor uses a time the reply signal arrived at the satellite gateway and a time difference between the broadcast of the interrogation signal to the remote terminal and its receipt at the satellite gateway. To do so, the processor accounts for known delays in the signal path between the communications satellite and the remote terminal and the point at which the time-of-arrival information is measured at the satellite gateway. The processor also calculates an intersection curve between a sphere, whose radius is the range previously determined, and a model of the surface of the Earth. Furthermore, the processor determines several initial points on the intersection curve, one of which points must lie within a known convergence zone around the terminal. Next, the processor calculates candidate position solutions for each initial point, and then screens the candidate solutions using predetermined criteria and discards any candidates not satisfying the screening. Finally, if more than one candidate solution remains, the processor selects the solution representing a best fit of all the observation data.

In the above system, the predetermined criteria may include one or more selected of the following: a solution range to the communications satellite, solution residuals, a solution altitude, a solution clock bias, and a solution proximity to a beam boundary.

BRIEF DESCRIPTION OF THE DRAWINGS

FIG. 4b depicts a flow chart of the calculations performed by the processor in the SOC.

DETAILED DESCRIPTION

Figure 1:
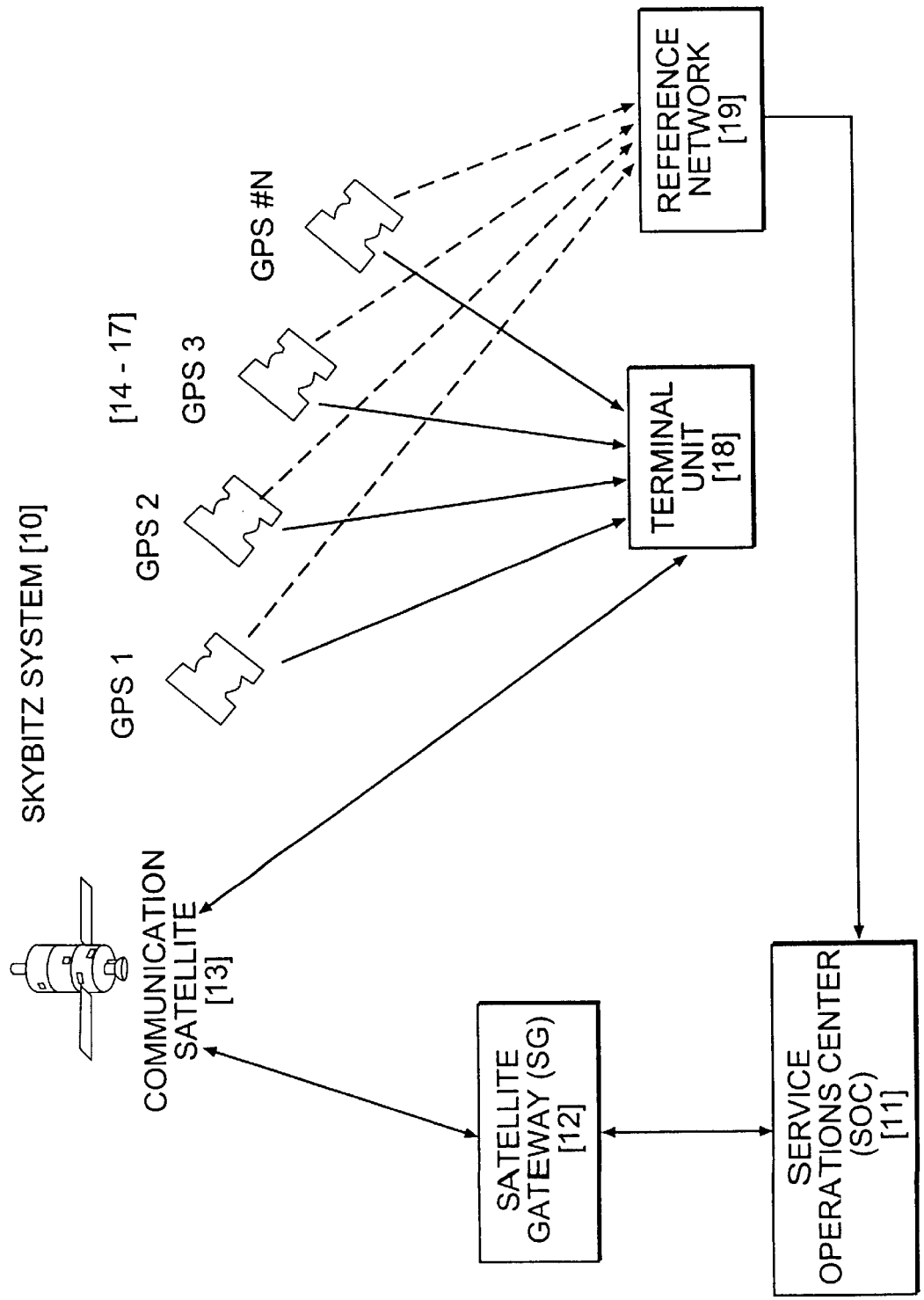
FIG. 1 depicts a block diagram of an exemplary embodiment of a system according to the present invention.

Referring to FIG. 1, an exemplary embodiment of a system [10] includes a Service Operations Center (SOC) [11], which is coupled to a Satellite Gateway (SG) [12], a communications satellite [13], satellites in the Global Positioning System (GPS) [14–17], a terminal unit [18], and a Reference Network (RN) [19]. The terminal unit [18] receives signals from multiple GPS satellites [14–17], and the communications satellite [13].

The terminal unit [18] receives a broadcast message on its forward communications satellite link, which broadcast message contains timing and acquisition aiding information. Following receipt of the message, the terminal unit performs its observation data collection function, and then transmits back to the SOC the observation data, along with any necessary system and/or status information, at a fixed delay from the received broadcast information. All processing of the observation data is done at the SOC [11]. The terminal unit [18] merely takes measurements and returns the observations as part of the broadcast/response cycle.

Service Operations Center

The SOC [11] controls the operation of the system [10] of the present invention. The SOC [11] broadcasts a signal on the forward link which contains timing and acquisition aiding information that can be received and used by the remote terminals to synchronize time and to rapidly acquire their intended GPS signals, from which they take their observation data set. The forward broadcast can also contain command and control protocols for individual and/or groups of terminals.

The return signal from the terminal [18] includes the observation data along with any system, status or protocol information necessary to operate the system. The return signal is synchronized to the forward signal by a specific and known delay, which allows the Satellite Gateway [12] to take an additional measurement of the round-trip signal propagation time and absolute Time-of-Arrival (TOA).

This calculated propagation time is used along with certain observation data to determine position. More specifically, the time required for the signal to propagate to the mobile terminal and back is used to resolve the ambiguity otherwise inherent in the observation data. The SOC also collects, on a continuous basis, all ancillary information necessary to the position calculations from a Reference Network [19] and other sources. As an example, this information includes:

1. GPS broadcast ephemerides and clock correction coefficients for all satellites in view over the region of interest;
2. Current GPS Almanac;
3. Current ionospheric and tropospheric parameters;
4. Current Status messages and advisories;
5. Current communications satellite state vector and operational status; and
6. Differential correction data (if used).

Satellite Gateway

The Satellite Gateway [12] consists of satellite communications modems (channel units) and associated control and management equipment and software. The gateway maintains an accurate time and frequency reference for control of the forward link broadcast, and for propagation time measurements. The terminal needs only to accurately respond relative to the forward signal and therefore can use a much less accurate, and low power, internal reference. The satellite gateway [12] is a traditional satellite communications facility. Therefore it also includes antenna, transmitter, amplifier, up/down conversion, and other standard satellite communications equipment and software that is not shown, but is known to those of skill in this art.

Communications Satellite

The communications satellite can be any (LEO, MEO, GEO) satellite capable of transponding the forward and return signals to/from the terminal and satellite gateway. As used herein, communications satellite refers to any device orbiting or otherwise above the surface of the earth, which device is capable of transmitting and receiving a signal. However, it should be noted, that the GPS satellites referred to herein are broadcast only, hence are not intended to be included within the definition of a communications satellite. The communications satellite could also be a balloon, airplane, remotely piloted vehicle or other aircraft operating within the atmosphere (Non-Bent pipe satellites can also be used if all delays in the transmission path are known and removed or otherwise accounted for). The Satellite (or aircraft) position and velocity information, as well as transponder group delay and other operational parameters must be known. Examples of suitable communications satellites include:

1. Orbcomm
2. Globalstar
3. ICO
4. AceS
5. Hughes MSAT
6. Thuraya
7. Iridium

Other communications satellites are possible for use in the present invention, which satellites are known to those of skill in the art.

Terminal Unit

The present invention only requires that the mobile terminal [18] receive a signal, make observations (measuring certain aspects of the GPS signals), and return another signal, which includes the observation data, and can be accomplished over a very short interval. There are various types of observation data that can be relayed to the central site to enable the central site to determine the position of the mobile terminal.

One possibility is to collect code phase and/or carrier phase information inherent in the GPS signal. This enables the mobile unit to remain on for a very short time, thereby helping to minimize the Time-To-First-Fix. Other signal characteristics that can be measured by the terminal are Doppler-shift information, bit phase information, or Fourier transform coefficients. Another possibility is to digitize a brief interval of the received GPS signal and transmit the digital data to the central site. The central site can then reconstruct the received signal, and determine the position based on certain characteristics in the received signal, such as Doppler shift, code phase of arrival of the received signal, bit phase information, etc.

Exemplary Embodiment of a Method of the Present Invention

The following provides an exemplary embodiment of the present invention, in which Code Phase of Arrival (COA)

information is used to determine the position of the mobile terminal. Other measurements are also possible, as stated above.

Figure 2:
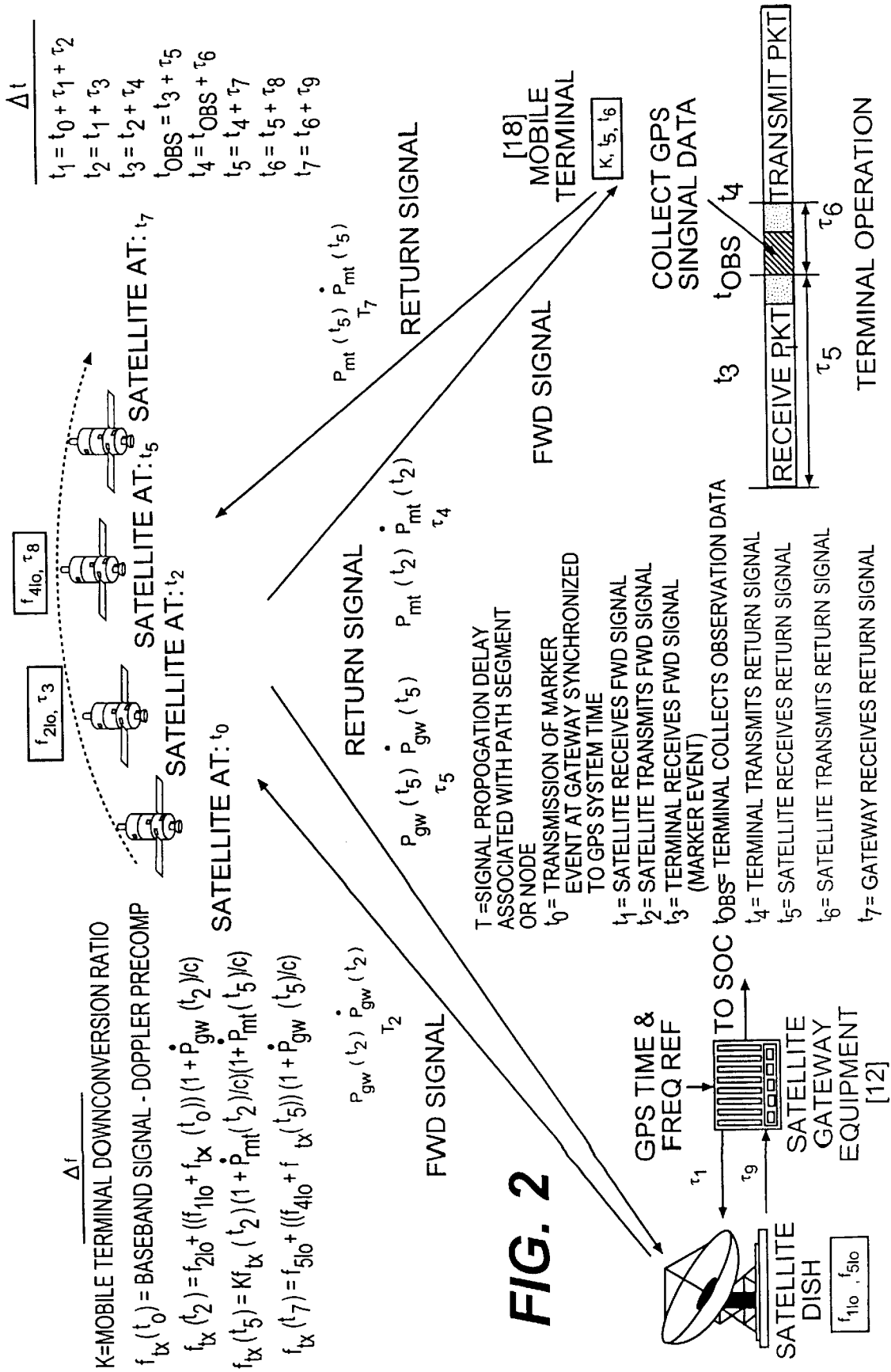
FIG. 2 depicts a diagram of an exemplary embodiment of the method according to the present invention.
Figure 3:
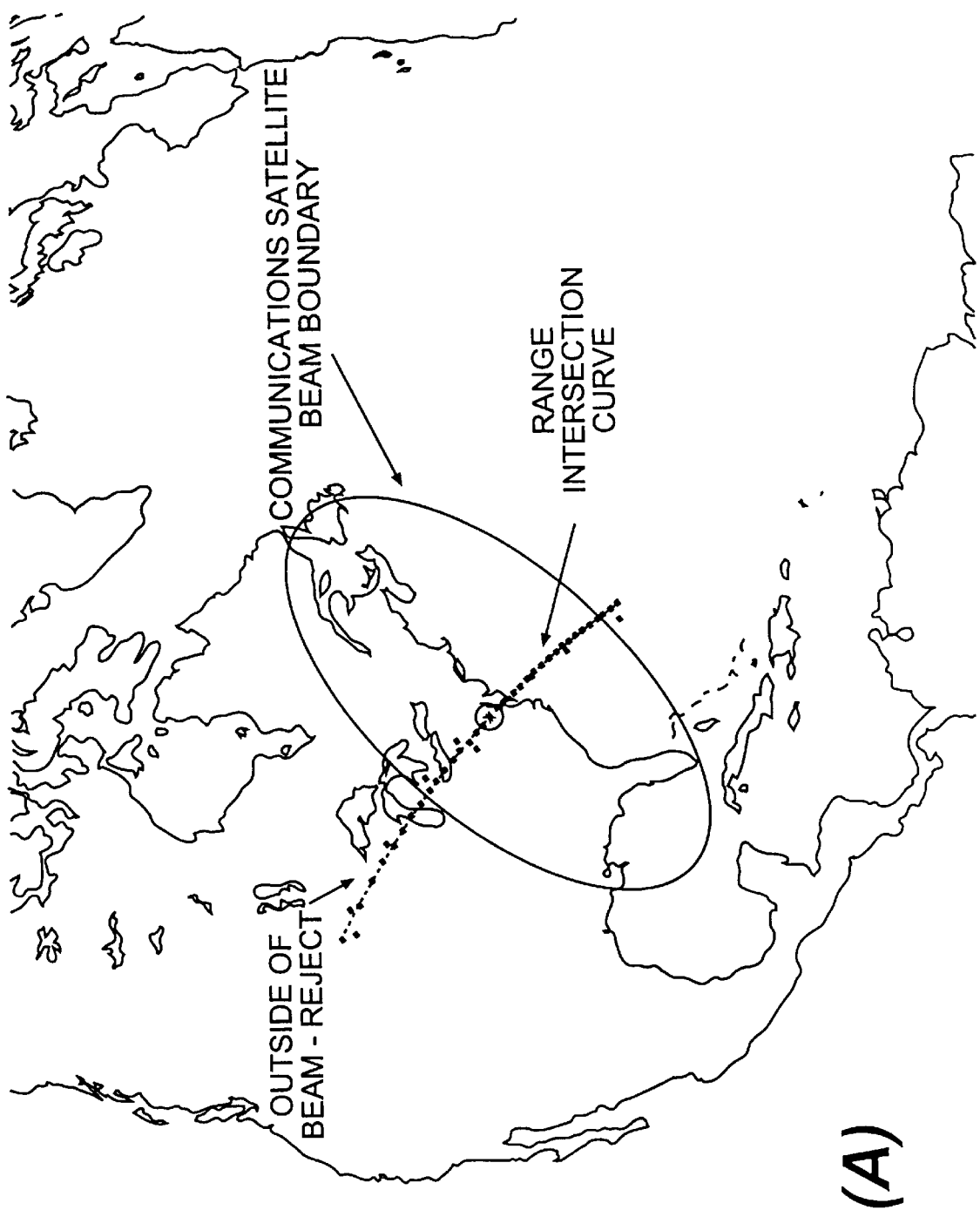
FIGS. 3(a) and 3(b) depicts a geographical representation of the method of FIG. 2 used to locate a terminal unit according to the present invention.

Referring to FIG. 2, at time t°, a Satellite Gateway (SG) [12] transmits a forward signal, with a marker event, through a communications satellite [13] to a region of the Earth bounded by the satellite beam pattern as in FIG. 3. An example of a marker event is a synchronization data pattern in the packet preamble.

Depending on the communications satellite employed, multiple regions may be covered by different beams. Consequently, signals may be transmitted to these regions either in sequence or simultaneously.

The satellite [13] receives the signal at time $t_1$, and retransmits the signal back to earth at time $t_2$. Subsequently, at time $t_3$, the remote terminal [18] receives the signal with the marker event.

When the remote terminal [18] needs to report its position, it searches for the SG signal in the satellite downlink. This signal contains information to aid acquisition (e.g., a prioritized list of GPS satellite vehicles in view over the coverage region, Doppler offset information, timing reference, etc.). Satellite vehicles in the list are prioritized to allow the mobile terminal [18] to search for and select those satellites that provide a favorable observation set of GPS satellites (i.e., to minimize dilution of precision, exclude degraded or non-operational satellites, etc.). The SG [12] also synchronizes the outbound transmission relative to a GPS timing reference.

Using the acquisition information recovered from the forward message, the remote terminal [18] receives a multitude of GPS signals starting at time $t_{obs}$, which is a fixed and known time interval from $t_3$. The operation of the receiver is synchronized with the signal received from the SG [12]. In turn, the signal received from the SG [12] is synchronized to GPS time (such as the X1 epoch). Consequently, the receiver clock offset associated with the GPS spreading codes used to recover the signals can be estimated back at the ground station with reasonable (less than +/− 0.5 milliseconds) accuracy.

The terminal [18] measures the Code Phase of Arrival (COA) of each of the GPS signals at $t_{obs}$. The terminal [18] then relays this measurement to the SG [12] by transmitting a return signal back through the communications satellite at time $t_4$, which also has a fixed and known relationship to the inbound timing reference $t_3$.

The communications satellite [13] receives the return signal from the mobile terminal at time $t_5$ and retransmits the same signal back to the SG [12] (or another ground station) at time $t_6$. The return signal is received by the SG at time $t_7$ and compared to the forward link timing reference and a round-trip propagation time measurement is taken. In addition, Absolute Time of Arrival (TOA) measurements are taken. The SG [12] recovers the contents of the return transmission and forwards the data along with its propagation time and TOA measurements to the SOC [11].

Exemplary Embodiment of Position Determination Calculations Performed at Service Operations Center The SOC [11] calculates the magnitude of the range vector between the communications satellite [13] and the terminal [18] by removing all known delays from the propagation time measurement. This is accomplished using the communications satellite position, velocity and transponder group delay information, the Satellite Gateway antenna position, known signal delays in the ground cable/equipment path, and if desired, any atmospheric or other transmission path delays that can be modeled. These delays and the relationships between the times are depicted in FIG. 2. This range calculation is fairly standard and common practice in the satellite communications field, and would be known to those of skill in the art. Also shown in FIG. 2 is the time relationship between receipt of the interrogation signal at time $t_3$ and the collection of the observation data after predetermined delay $\tau_5$. After a second known delay ($\tau_5+\tau_6$) from receipt of the interrogation signal at $t_3$, the remote terminal transmits a reply signal to the communications satellite at time $t_4$.

After the range between the communications satellite [13] and the terminal [18] is determined, the SOC [11] determines an arc of possible locations. This is determined by computing an intersection curve 31 (see FIG. 3) of a sphere, centered at the communications satellite having a radius given by the calculated range from the satellite [13] to the terminal [18], with a model of the surface of the Earth.

The Earth can be modeled as a mathematical approximation, such as an ellipsoid, or a geoid model, or with Terrain Elevation Data. The following is one possible example of these calculations using an ellipsoid model:

The Earth can be modeled as an ellipsoid of revolution. The ellipsoid parameters depend on choice of reference frame (e.g., WGS-84). This surface can be expressed:

$$\frac{x^2}{a^2}+\frac{y^2}{a^2}+\frac{z^2}{b^2}=1$$

Where a and b are constants representing axes of the chosen ellipsoid.

One possible parameterization of the ellipsoid surface could be:

$x = a\,\sin(\emptyset)\cos(\lambda)$ $y = a\,\sin(\emptyset)\sin(\lambda)$ $z = b\,\cos(\emptyset)$ $\emptyset = 0$ to $\pi$ with 0 being the positive z-axis. And $\lambda = 0$ to $2\pi$ with 0 being the positive x-axis.

The equation of a sphere at point ($X_s$, $Y_s$, $Z_s$) with radius $\rho$ (slant range):

$(X-X_s)^2+(Y-Y_s)^2+(Z-Z_s)^2=\rho^2$

Substituting the Ellipsoid equation into the Sphere equation and simplifying gives:

$(a\,\sin(\emptyset)\cos(\lambda)-X_s)^2+(a\,\sin(\emptyset)\sin(\lambda)-Y_s)^2+(b\,\cos(\emptyset)-Z_s)^2=\rho^2$ $(b^2-a^2)\cos(\emptyset)^2-2a\,\sin(\phi)\cos(\lambda)X_s-2a\,\sin(\phi)\sin(\lambda)Y_s-2b\,\cos(\phi)Z_s=\rho^2-a^2-r^2$ Organizing the coefficients to allow a 'choose Phi - - - solve Lambda' Scenario:

$A=-2a\,\sin(\phi)X_s$ $B=-2a\,\sin(\phi)Y_s$ $C=(b^2-a^2)\cos(\phi)^2-2b\,\cos(\phi)Z_s+r^2+a^2-\rho^2$ $A\,\cos(\lambda)+B\,\sin(\lambda)+C=0$ Choosing Phi over the range of interest, calculating coefficients, and solving for Lambda gives:

$$\lambda = -2\tan^{-1}\left[\frac{(B \pm \sqrt{B^2 + A^2 - C^2})}{(A - C)}\right]$$

Figure 3B:
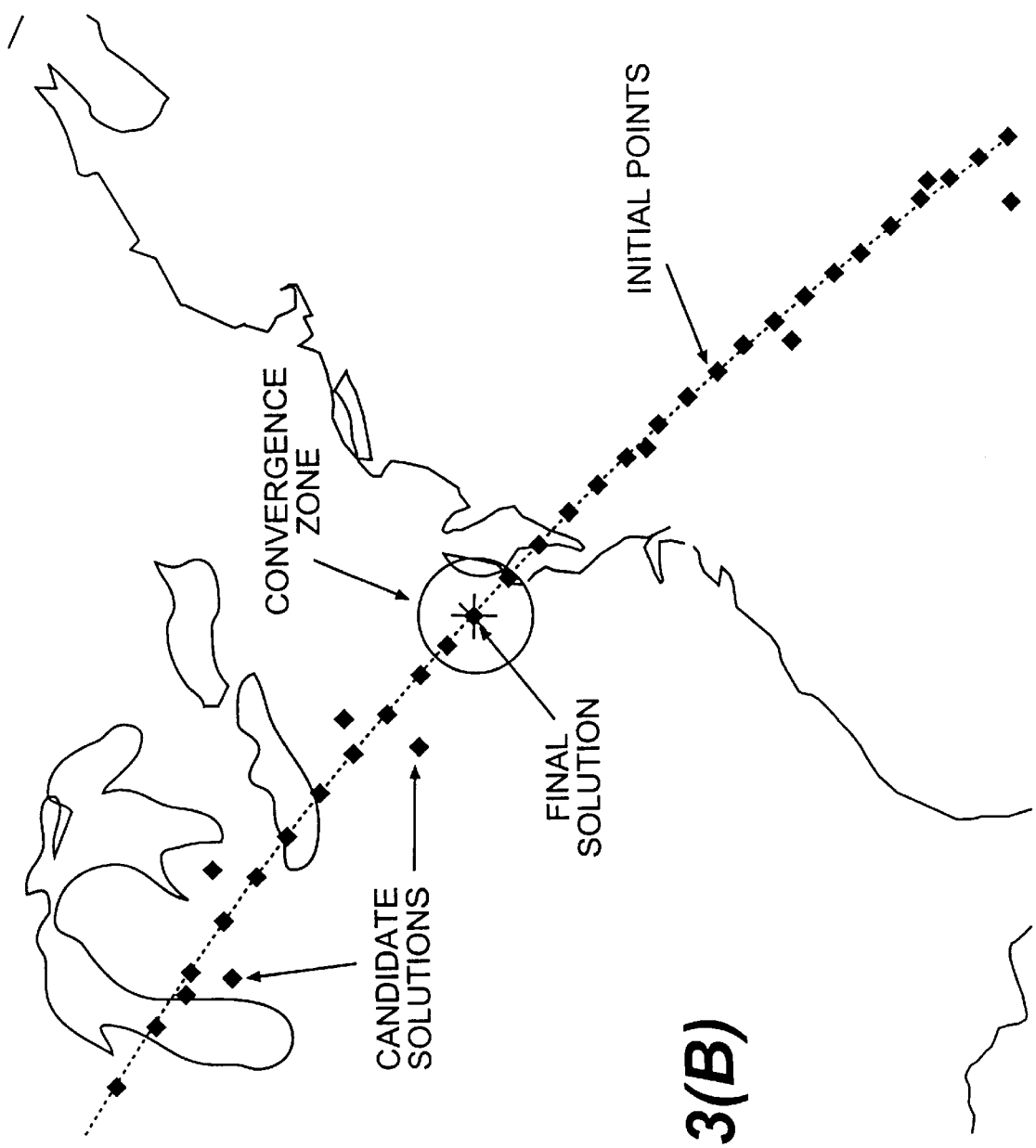

The spacing of points on the paramaterized intersection curve depends on spacing of chosen points φ and the earth model chosen and is depicted in FIG. 3(b). The choice of parametrization method need only guarantee that at least one of the initial points 37 will fall within the convergence zone 34 around the true solution 35. As used herein, convergence zone 34 refers to the area around the location of the remote terminal in which a point must lie to guarantee that the position calculation will converge to that location. The size of the convergence zone 34 will vary depending on number, quality and type of observation data used, but as an example, the convergence zone 34 for the code phase observations is approximately a radius of 75–80 Km (See FIG. 3(b)).

One could also use a Geoid model or digital terrain information to construct a similar arc of points by keeping only those points with a range to the communication satellite that is within a certain tolerance.

Points could be sub-sampled or interpolated as desired due to the fact that these only represent a first approximation as input to the least squares algorithm. It is only required that at least one point on the arc lay within the guaranteed convergence zone 34 around the true solution.

Only that portion of the arc 31 within the region of the Earth bounded by the satellite beam pattern is retained by the SOC, the rest are rejected (see element 33, FIG. 3a). Refer to FIG. 3(a), which depicts the bounding of the arc (or parameterized intersection curve 31) by the beam pattern 32.

The SOC next determines the time that the mobile terminal collected the GPS signal ($t_{obs}$). The collection time is determined from the range between the satellite and the terminal and SG, the known delays in the transmission paths (i.e., transponder group delay, atmosphere, etc.), the terminal collection method (i.e., fixed delay from $t_3$ and integration period), and the absolute TOA measurement.

The SOC then employs a satellite orbit model to estimate the positions of the GPS satellites at their time of transmission ($t_{xmt}$). GPS $t_{xmt}$ is calculated from $t_{obs}$ less the GPS signal transit time (user must also correct for earth rotation during signal transit time if working in Earth fixed coordinates).

Using each point on the arc as an initial guess, an iterative least squares technique fits the observation data to the predicted data and minimizes residual error. One example of these calculations follows:

Create system of linearized normal equations for least squares solution.

$$-\frac{X^k - X^0}{(P_i^k)^0}x_i - \frac{Y^k - Y^0}{(P_i^k)^0}y_i - \frac{Z^k - Z^0}{(P_i^k)^0}z_i + c\Delta t_i = (P_i^k)_{obs} - (P_i^k)^0 - \varepsilon_i^k$$

$(P_i^k)_{obs} - (P_i^k)^O = b_i$ $A\hat{x} = b - \epsilon$

We assume the code observation $P_{obs}$ is corrected for the clock offset of the satellite according to the broadcast ephemerides (and atmospheric delays if desired). The preliminary value $P_O$ is calculated from the initial coordinates of the satellite and from the arc of points generated previously. First guess at receiver clock offset can be estimated from broadcast signal timing and slant range to the terminal.

Alternately, an additional observation may be taken to guarantee a unique solution if receiver clock offset cannot be estimated to within 0.5 msec.

$$\begin{bmatrix} -\frac{X^1 - X_i}{\rho_i^1} & -\frac{Y^1 - Y_i}{\rho_i^1} & -\frac{Z^1 - Z_i}{\rho_i^1} & 1 \\ -\frac{X^2 - X_i}{\rho_i^2} & -\frac{Y^2 - Y_i}{\rho_i^2} & -\frac{Z^2 - Z_i}{\rho_i^2} & 1 \\ \vdots & \vdots & \vdots & 1 \\ -\frac{X^m - X_i}{\rho_i^m} & -\frac{Y^m - Y_i}{\rho_i^m} & -\frac{Z^m - Z_i}{\rho_i^m} & 1 \end{bmatrix} \begin{bmatrix} x_i \\ y_i \\ z_i \\ c\Delta t_i \end{bmatrix} = b - \varepsilon$$

$$\begin{bmatrix} x_i \\ y_i \\ z_i \\ c\Delta t_i \end{bmatrix} = (A^T C A)^{-1} A^T C b$$

$\hat{r} = b - A\hat{x}$

The right side of the normal equations b represents the difference between the expected and observed code phase (modulo 1 msec) and is ambiguous. The receiver clock offset is also treated as a modulo 1 msec value. The integer ambiguity is assumed by the choice of preliminary coordinates. Matrix b is kept in the +/−0.5 msec range as a difference between two modulo 1 msec values. This forces convergence to a solution within ~150 Km from the preliminary coordinates. Matrix C is the weight matrix (inverted covariance matrix) derived from signal strengths and/or GPS satellite URE (User Range Error) values and is used in a weighted least squares solution, or set to the identity matrix for a non-weighted solution. Matrix r is the residuals matrix and can be weighted and/or summed, or analyzed as a covariance matrix with minor manipulation.

After convergence, this estimated position solution is then screened against the measured range to the communications satellite (with known tolerance), satellite beam boundaries, an acceptable altitude range (with respect to the ellipsoid, geoid or elevation model used), an acceptable receiver clock offset range, and a maximum residual threshold. Those position estimates not meeting these criteria are discarded. An example for each method follows:

Range: The initial estimate(s) lie on an arc of constant range from the communication satellite. If the candidate solution lies outside the known tolerance of this range estimate then it is discarded.

Altitude: The initial estimate(s) lie on the chosen earth model surface. If the candidate solution lies above/below the maximum/minimum height possible relative to this earth model then it is discarded.

Beam: The initial estimate(s) lie within the beam coverage footprint. If the candidate solution lies outside the beam boundary it is discarded.

Clock Bias Tolerance: The calculated receiver clock bias must fall in the range of the estimated clock bias (with known tolerance) from the propagation time measurement. If the candidate solution falls outside this range it is discarded. Therefore, as the accuracy on the propagation time measurement increases, this becomes a more valuable discriminator.

Residuals: It has been observed that the residuals (goodness of fit) for the converged solutions (for an over-determined problem) are smallest for the true position estimate. The residuals provide an effective discriminator between ambiguous position solutions when the above least squares method is used. Therefore, an empirically determined or calculated threshold can be used (alone or in conjunction with the other screening criteria) to screen false candidates.

The remaining position estimate(s) can then be improved by using Atmospheric (Ionospheric and/or tropospheric) corrections to the code phase observations to further improve the position accuracy of this process (if desired), and then subjected to a final screening and residual comparison, (e.g., minimum RMS) and the best point selected. Other screening criteria could be employed based on geospatial data sets, or application specific criteria (e.g., must be over land, or near a rail line, etc.).

It should be noted that if the area of interest is small enough (i.e.—within the guaranteed convergence zone), such as a very narrow satellite beam, an area or city covered by an aircraft platform, or a cellular tower coverage zone, then the additional range measurement and the screening process are unnecessary, and a unique solution will result from an initial estimate at the center of the area of interest.

Well known differential correction (DGPS) techniques can be applied to the final correct position to further increase its accuracy since all the same error sources in a standard GPS solution apply here as well.

Figure 4A:
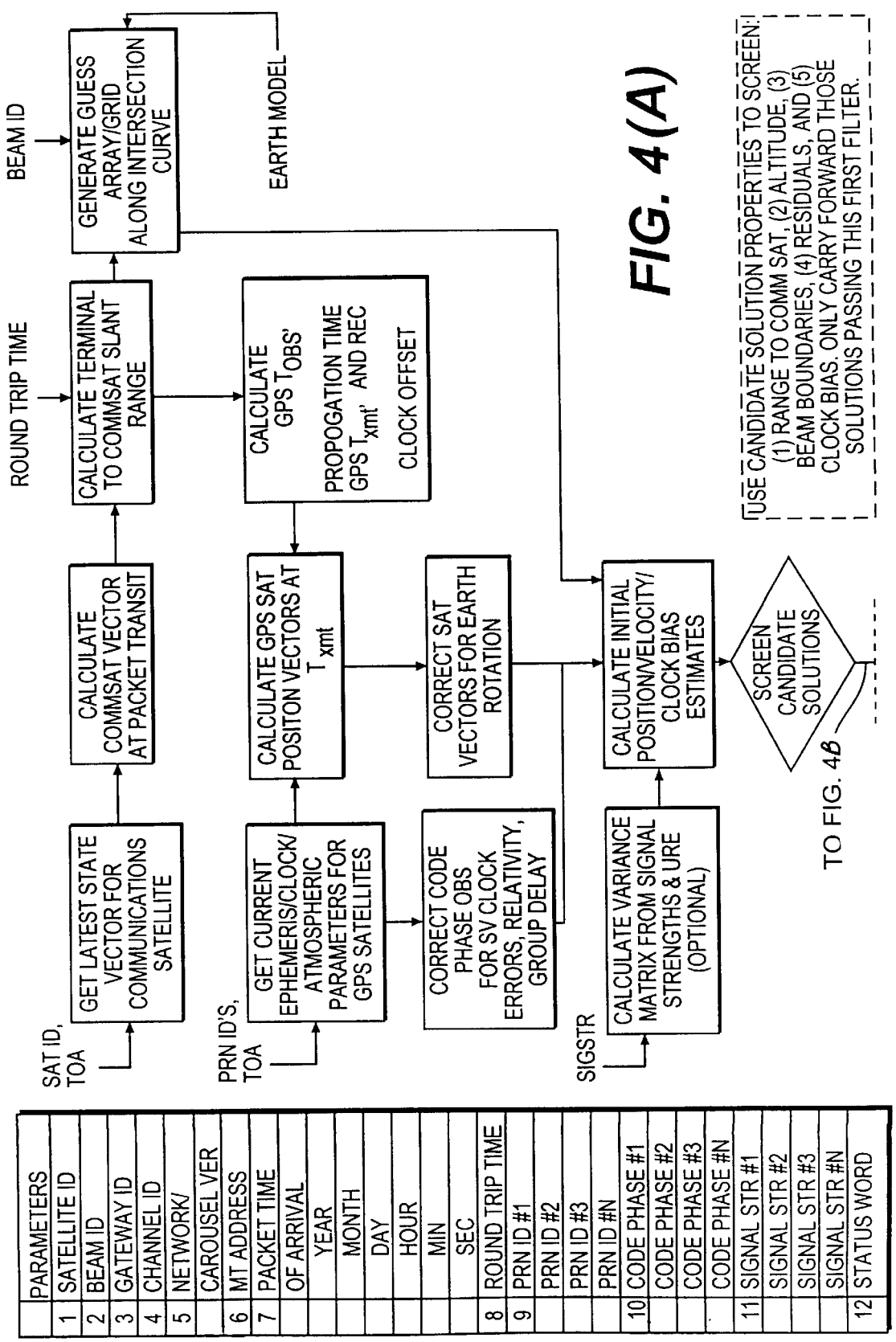
FIG. 4a depicts the various parameters returned to the Service Operations Center and used in calculating the position solution.

FIG. 4a lists the various parameters returned to the processor in the SOC, which parameters are used in the position calculation. The satellite ID, beam ID, gateway ID, channel ID, and network carousel version are all appended by the satellite gateway upon receipt and demodulation of the signal from the mobile terminal. The signal from the mobile terminal includes the mobile terminal address and items 9–12 in the list in FIG. 4a. The mobile terminal address can also be added by the satellite gateway, if using an assigned time slot for each mobile terminal, in which case the satellite gateway knows the terminal assigned in each time slot. The packet time of arrival and the round trip time are both determined by the satellite gateway and appended to the received data packet.

FIG. 4b depicts the above calculations 40 performed by a processor in the SOC [11] in flow chart form, which is suitable for implementing in software for execution on a general purpose computer. Upon receipt of the information packet at the SOC [11] containing the observation data from the terminal [18] and the measurement and ancillary data from the SG [12], the SOC processor obtains the latest state vector [41] for the communication satellite [13], and the ephemeris, clock and atmospheric data [47] for the GPS satellites [14–17]. The abbreviation SV in FIG. 4b stands for "space vehicle".

The SOC [11] then performs a series of calculations [42–46 and 48–51] as shown in the flow diagram resulting in several candidate position solutions. The candidate solutions are then screened [52] per the criteria described previously, and another iteration [53–57] is performed, which can include the atmospheric correction data [56]. If there is more than one remaining solution then a final screen [59] and selection takes place. The final position obtained can then be converted to the desired coordinate system [60–61].

The above represents exemplary embodiments of certain aspects of the present invention. Other variations are possible as would be apparent to those of skill in the art.

What is claimed is:

1. A system for determining a location of a remote terminal located on or near the surface of the Earth by communicating with an orbiting communications satellite, said system comprising:
   a) a satellite gateway broadcasting an interrogation signal to the remote terminal via the communications satellite;
   b) said remote terminal including:
      (i) a receiver receiving the interrogation signal from the communications satellite, said receiver receiving a plurality of signals being broadcast from a plurality of GPS satellites;
      (ii) a processor measuring at least one characteristic in each of the plurality of signals being broadcast from the plurality of GPS satellites at a first predetermined time relative to receipt of the interrogation signal from the communications satellite; and
      (iii) a transmitter transmitting a reply signal at a second predetermined time relative to receipt of the interrogation signal to the communications satellite, wherein said reply signal includes the measured characteristic in each of the plurality of signals being broadcast from the plurality of GPS satellites;
   c) an earth station receiving the reply signal from the communications satellite, and measuring time of arrival information; and
   d) an operations center calculating a position of the remote terminal using time of arrival information and the measured characteristics returned by the remote terminal.

2. The system according to claim 1, wherein the measured characteristic includes code phase information.

3. The system according to claim 1, wherein the measured characteristic includes carrier phase information.

4. The system according to claim 1, wherein the measured characteristic includes Doppler-shift information.

5. The system according to claim 1, wherein the measured characteristic includes bit phase information.

6. The system according to claim 1, wherein the measured characteristic includes Fourier transform coefficients.

7. The system according to claim 1, wherein the service operations center includes a processor, said processor:
   a) calculating a range between the communications satellite and the remote terminal using a time the reply signal arrived at the service operations center and a time the communications satellite broadcast the interrogation signal to the remote terminal and accounting for known delays in a communication path between the communications satellite and the remote terminal and a point at which the time of arrival information was measured;
   b) calculating an intersection curve between a range sphere having a range determined in step a) and a model of the surface of the Earth;
   c) determining a plurality of initial points on the intersection curve, one of said plurality of initial points being within a convergence zone of the remote terminal;
   d) calculating a plurality of candidate solutions;
   e) screening the plurality of candidate solution points using a predetermined criteria and discarding any candidate points not satisfying the screening; and
   f) selecting a position representing a best fit of observation data using final solution residuals.

8. The system according to claim 7, wherein the predetermined criteria includes one or more selected from the group consisting of: a solution range to the communications satellite, solution residuals, a solution altitude, a solution clock bias, and a solution proximity to a beam boundary.

9. A method for determining a position of a remote terminal on or near the surface of the Earth comprising the steps of:
   a) broadcasting an interrogation signal to a remote terminal unit;

b) receiving the interrogation signal at the remote terminal unit;
c) receiving a plurality of signals being broadcast from a plurality of GPS satellites at the remote terminal unit;
d) measuring at least one characteristic in each of the plurality of signals being broadcast from the plurality of GPS satellites upon receipt of the interrogation signal from a communications satellite;
e) transmitting a reply signal at a predetermined time relative to receipt of the interrogation signal, wherein said reply signal includes the at least one measured characteristics in each of the plurality of signals being broadcast from the plurality of GPS satellites;
f) receiving the reply signal at a satellite gateway;
g) measuring time of arrival information in the satellite gateway; and
h) calculating a position of the remote terminal unit using the time of arrival information and the at least one measured characteristics returned by the remote terminal unit.

10. The method according to claim 9, further comprising the steps of:
h) obtaining current ephemeris/clock/atmospheric parameters for a plurality of GPS satellites;
i) obtaining Time of Arrival (TOA) and Round Trip Time measurements at the satellite gateway;
j) using the Time of Arrival (TOA) and Round Trip Time measurements along with the current ephemeris/clock/atmospheric parameters to calculate a GPS time of observation, a signal propagation time, a GPS transmit time, and receiver clock offset; and
k) calculating a plurality of GPS satellite state vectors at a time of transmission.

11. The method according to claim 9, further comprising the step of correcting a plurality of code phase observations for at least one of the group consisting of: SV clock errors, relativity, and group delay.

12. The method according to claim 9, further comprising the step of correcting the GPS satellite state vectors to compensate for Earth rotation.

13. The method according to claim 9, further comprising the step of calculating a variance matrix from signal strength measurements and GPS satellite URE parameters.

14. The method according to claim 10, further comprising the steps of:
k) calculating initial position/velocity/clock bias estimates;
l) screening the initial position estimates using at least one from the group consisting of: solution proximity to beam boundary, solution residuals, solution altitude, solution proximity to communication satellite range, and receiver clock bias solution, wherein only those candidate locations passing this screening are carried forward; and
m) calculating azimuth and elevations for each of the candidate locations.

15. The method according to claim 14, further comprising the step of correcting propagation and transmission times based on the initial positions.

16. The method according to claim 15, further comprising the step of correcting code phase observations for at least one from the group consisting of: state vector clock errors, relativity, group delay and ionospheric and tropospheric delays.

17. The method according to claim 16, further comprising the step of correcting the plurality of GPS satellite state vectors to compensate for rotation of the Earth.

18. The method according to claim 13, further comprising the step of using the variance matrix determined from the signal strengths/URE to calculate improved position/velocity/clock bias estimates.

19. The method according to claim 17, further comprising the steps of determining a final position/velocity/clock bias estimate and converting the final position/velocity/clock bias estimate to a desired coordinate system.

20. A method for determining a position of an object on the surface of the Earth, comprising the steps of:
a) receiving an interrogation signal from a communications satellite;
b) measuring, at a predetermined time relative to receipt of the interrogation signal, a plurality of characteristics in a plurality of signals being broadcast from a plurality of GPS satellites; and
c) transmitting a response signal to the communications satellite after a predetermined delay relative to the receipt of the interrogation signal, wherein the response signal includes the plurality of measured characteristics.

21. The method according to claim 20, further comprising the step of:
d) calculating at a central site a range sphere on which the object must lay using a range to the remote object determined from measurements of a round trip travel time of the interrogation signal and the reply signal, excluding known delays and the predetermined delay.

22. The method according to claim 21, further comprising the step of:
e) using the measured characteristics to determine a plurality of points on an intersection curve determined from an intersection of the range sphere and the surface of the Earth.

23. The method according to claim 22, further comprising the step of:
f) performing a residual error test to select an optimum point from among the plurality of points which optimum point represents the location of the object.

24. A method for determining the position of a remote terminal on or near the position of the earth, comprising the steps of:
sending an interrogation signal to the remote terminal from a communications satellite;
obtaining measurements of a signal characteristic from a plurality of GPS satellites;
transmitting the measurements to a satellite gateway after waiting a predetermined time from receipt of the interrogation signal; and
determining the position of the remote terminal on or near the position of the earth from the transmitted measurements.

25. The method recited in claim 24, wherein the step of determining the position of the remote terminal comprises the step of generating an intersection curve along the surface of the earth on which the remote terminal can be located.

26. The method recited in claim 25, wherein only one intersection curve along the surface of the earth is generated.

27. The method recited in claim 25, wherein the step of determining the position of the remote terminal further comprises the steps of:

selecting initial points along the intersection curve; and determining a set of candidate points.

28. The method recited in claim 27, wherein the step of determining the position of the remote terminal further comprises the step of screening the candidate positions according to one or more criteria.

29. The method recited in claim 28, wherein the one or more criteria are from the set of: a solution range to the communications satellite, solution altitude, solution residuals, a solution clock bias and a solution proximity to a beam boundary of the communications satellite.

30. The method recited in claim 27, wherein the step of determining a set of candidate points comprises the step of using the initial points as seeds to a least squares fit to estimate location on the basis of the measurements.

31. The method recited in claim 30, wherein the measurements are code phase of arrival measurements.

32. The method recited in claim 31, further comprising the steps of:

calculating a range vector between the communications satellite and the remote terminal;

measuring a propagation time from the time the interrogation signal is sent until the measurements are received by the satellite gateway; and removing known delays from a propagation time measurement.

33. The method recited in claim 28, further comprising the steps of:

using the determined candidate points as new initial points;

calculating new candidate points using the new initial points; and screening the new candidate points according to the criteria.

34. The method recited in claim 33, wherein the steps are repeated until there is only one candidate point.

35. The method recited in claim 34, further comprising the step of displaying the one candidate point on a map.

* * * * *